United States Patent [19]

Kuster

[11] Patent Number: 4,669,225

[45] Date of Patent: Jun. 2, 1987

[54] DEVICE FOR DRIVING A BODY THAT PERFORMS A TUMBLING AND ROTATING MOVEMENT

[75] Inventor: Kaspar Kuster, Basel, Switzerland

[73] Assignee: Oloid AG, Basel, Switzerland

[21] Appl. No.: 775,686

[22] Filed: Sep. 13, 1985

[30] Foreign Application Priority Data

Sep. 17, 1984 [DE] Fed. Rep. of Germany ....... 3434064

[51] Int. Cl.$^4$ .............................................. B24B 31/06
[52] U.S. Cl. ................... 51/163.1; 366/219; 91/536
[58] Field of Search ............ 91/536; 51/163.1; 366/211, 219

[56] References Cited

U.S. PATENT DOCUMENTS

| | | | |
|---|---|---|---|
| 1,099,985 | 6/1914 | Lamb | 51/163.1 |
| 2,302,804 | 11/1942 | Schatz | |
| 2,598,233 | 5/1952 | Deardorff | 91/536 |
| 2,953,164 | 9/1960 | Haberlaud | 91/536 |
| 3,073,081 | 1/1963 | Balz | 51/163.1 |
| 4,341,475 | 7/1982 | Saladin | |

FOREIGN PATENT DOCUMENTS

| | | |
|---|---|---|
| 1145455 | 9/1963 | Fed. Rep. of Germany . |
| 1207750 | 7/1966 | Fed. Rep. of Germany . |
| 2259737 | 6/1973 | Fed. Rep. of Germany . |
| 2842110 | 4/1980 | Fed. Rep. of Germany ..... 51/163.1 |
| 3034331 | 9/1984 | Fed. Rep. of Germany . |
| 216760 | 1/1942 | Switzerland . |
| 366710 | 2/1963 | Switzerland . |
| 496912 | 11/1970 | Switzerland . |

Primary Examiner—Harold D. Whitehead
Attorney, Agent, or Firm—Watson, Cole, Grindle & Watson

[57] ABSTRACT

For the purpose of driving a body (8) that, in order to perform a tumbling and rotating movement, is suspended by means of pivot pins (9) on two fork-shaped gimbals (5, 7) which are each connected by means of a pivot bearing (4, 6) to the end of one of two parallel drive shafts (2, 3), each of the drive shafts (2, 3) is driven by a hydraulic motor (12, 13). The two hydraulic motors (12, 13) are connected to a common hydraulic pump (14) by means of a branched line (15, 16, 17). The volumetric displacement of the pump (14) is divided between the two hydraulic motors (12, 13) in such a manner that each of the hydraulic motors (12, 13) is supplied with an alternately interchanging increasing or decreasing partial volume in order that the two drive shafts (2, 3) rotate non-uniformly in the manner required for uniform movement of the body, the kinematics of the system consisting of the mutually connected shafts (2, 3), the fork shaped gimbals (5, 7) and the body (8) producing the correct distribution of the quantities of oil between the motors.

6 Claims, 2 Drawing Figures

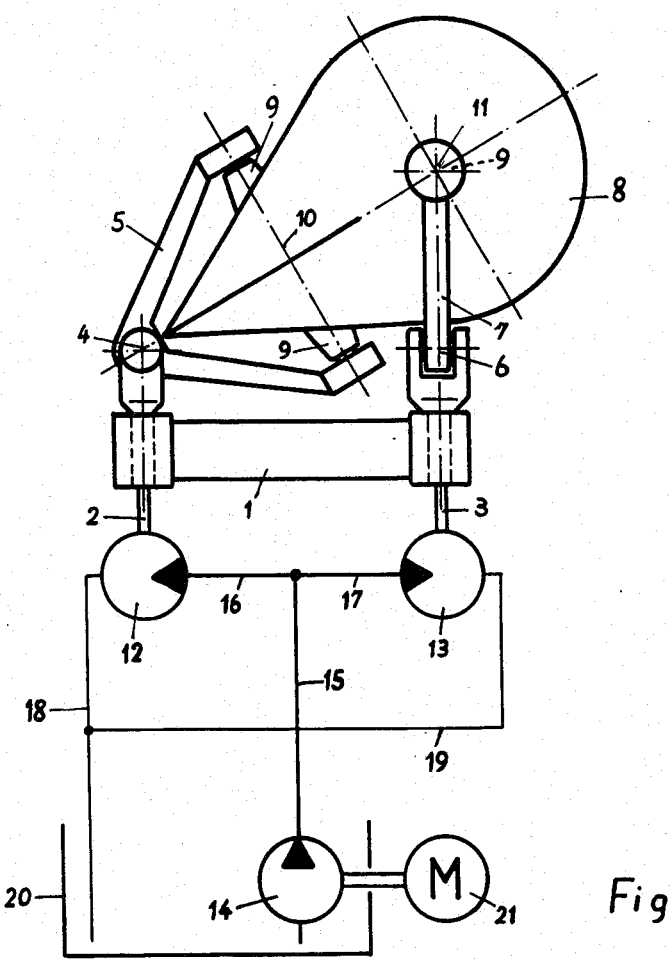
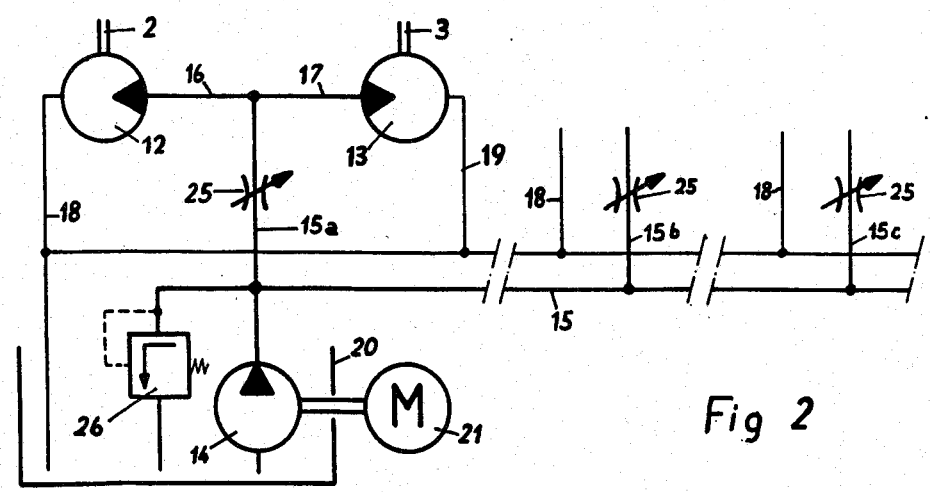

DEVICE FOR DRIVING A BODY THAT PERFORMS A TUMBLING AND ROTATING MOVEMENT

BACKGROUND OF THE INVENTION

The invention relates to a device for driving a body that, in order to perform a tumbling and rotating movement that is based on the principle of the invertable link chain, is suspended by means of pivot pins on two fork-shaped gimbals so that it moves about two axes that are askew to one another, which gimbals are each connected by means of a pivot bearing to the end of one of two parallel drive shafts which, in order to achieve uniform movement of the body, must rotate in opposite directions and at alternately interchanging increasing and decreasing angular speeds.

A tumbling and rotating body of this type is used especially as a hollow body for receiving material to be treated, which material is to be subjected to physical or chemical processes, the simultaneous tumbling and rotating movement achieving particularly favourable effects with regard to the course of such processes.

The body tumbling and rotating in the described manner is used especially for mixing, and the movement, which in known manner is based on the principle of the invertable link chain, does not allow centrifugal forces to arise which produce a separating effect. The advantage of the tumbling and rotating movement lies in the fact that each point on the body describes a three-dimensional path with no nodal point.

When considering a drive means for a body that is suspended in the manner described for the purpose of performing a tumbling and rotating movement it should be taken into account that each of the shafts on which the body is pivotally mounted by means of gimbals must rotate non-uniformly if an even distribution of the accelerations and decelerations that are required alternately on both shafts is to be achieved in the course of movement. If this condition is not fulfilled, the body moves non-uniformly, with the result that the above-mentioned special effects on the material to be treated in the body cannot be achieved and that premature wear to important parts of the machine will occur, especially in the bearings.

The above-described drive problem, which lies in the fact that when the angular speed of one shaft increases the other shaft must rotate at a decreasing angular speed, which process must continuously and alternately apply to each of the two shafts, is due to the special course of movement of this inversion-kinematic system. This non-uniformity of the angular speeds of the shafts for driving the body, which is stipulated by the system, gives rise to the difficulties involved in solving the problem of the drive means. Various proposed solutions are known.

DE-PS No. 1 145 455 discloses a solution to this problem which provides a positive drive mechanism using a universal joint between the shaft that is connected to the fork-shaped gimbal and a motor-driven shaft that forms an angle of 45° with the extended axis of the first shaft, which shaft is driven thereby. In the case of a universal joint, as is known, there occur periodically-changing angular speeds having a sinusoidal course. Apart from the large amount of space required by the entire drive means, the acute angle of 45° is also unfavourable. Wear occurs too rapidly, and the universal joints, which transfer the entire torque, vibrate. This solution has not proved satisfactory in practice.

For solving the problem of the drive means using a non-positive drive mechanism, a device for producing a tumbling and rotating body movement disclosed in DE-PS No. 1 207 750 has a compensating gear in the form of a frictional ball-mechanism on one of the drive shafts. A ball-bearing cage is arranged between a driving ring, which is arranged loosely on the drive shaft and is driven uniformly by a drive element, and a driven ring that is also arranged loosely on the drive shaft, which cage is keyed onto the shaft and causes the drive shaft to rotate, whilst the driven ring, which turns in the opposite direction to the shaft, is rigidly connected to a chain wheel in order, by way of a chain, to turn the second drive shaft, which is arranged in parallel in the opposite direction. Since, however, the two drive shafts rotate non-uniformly (while one drive shaft decelerates the other accelerates), in this compensating gear so much friction must inevitably arise that this solution is unsuitable for prolonged operation. This solution has therefore also proved unsatisfactory in practice and could never be utilised commercially.

Since the proposed solutions described above have too many shortcomings when put into practice, in the search for a suitable drive means a so-called pendulum drive means, known from CH-PS No. 496 912, has been developed in which on the drive shaft there is arranged a pendulum which is pivotally connected thereto and on which there is arranged a control element which is positively coupled to the shaft and is preferably in the form of a crank that is rotatably mounted on the pendulum and, being in operative connection with at least one fixed point on the device, produces a periodic swinging movement of the pendulum in dependence upon the speed of the shaft. The crank is driven by the shaft by means of a belt at half the speed of the shaft. The fixed point on the device that is in operative connection with the control element in the form of a crank is a guide slot in which the crank pin slides back and forth. On each revolution of the drive shaft the pendulum performs two complete backward and forward movements, and when the pendulum moves in the same direction as the direction of rotation of the drive shaft, acceleration occurs as a result of the superimposition of the two movements, and when the pendulum moves in the opposite direction, deceleration occurs. The resulting course of movement does not exactly follow a sinusoidal line, however, so that in order to obtain an ideal solution it is necessary to make further structural improvements in order that at every moment during movement the guide slot for the crank is in a position parallel with the longitudinal axis of the pendulum.

This drive means, which is suitable for practical purposes, has, however, the disadvantage that it is possible to drive only one shaft connected by means of the fork-shaped gimbal to the body to be set in motion, whilst the second shaft, which is connected to the body by way of the other fork-shaped gimbal, as a result of this connection via the gimbals also turns at the non-uniform angular speed characteristic of this system. The use of this drive means considerably reduces manufacturing costs and the space requirement in comparison with the drive means mentioned above and disclosed in DE-PS No. 1 145 455, but since only one shaft is driven and it is possible to obtain only a good approximation to the course of the angular speed, which is sinusoidal in an ideal case, a drive means of this construction sets certain limitations with regard to the size and weight of the body to be set in motion.

In order therefore to drive two shafts which are each connected by means of a fork-shaped gimbal to the body to be set in motion, U.S. Pat. No. 4,341,475 proposes a solution which provides for each of the shafts a resilient shaft coupling between a uniformly driven shaft part and the shaft part that is connected to the fork-shaped gimbal, there being supported between the coupling parts, against each of the two coupling parts displaced by an angle of 180°, balls and compression springs as energy storage means which are arranged in a circle alternately one behind the other and which allow a periodically repeated relative rotation of the coupling parts with respect to one another and thus, when energy is being stored, allow a deceleration and, when the stored energy is being released, allow an acceleration of the coupling part that is fixed to rotate with the shaft, the other uniformly driven coupling part being arranged to rotate relative to the shaft. Although this solution is suitable for relatively small bodies that are to be set in a tumbling and rotating motion, it cannot, however, produce the body movement that is necessary to obtain optimum mixing results which can be achieved only by a positive drive means, since this solution is characterised by a greater or lesser degree of resilience in the driving elements. The accelerations and decelerations required alternately on the two shafts do not take place at the correct moment as a result of the resilient members that are incorporated into the drive system, so that the rhythm of movement is interfered with. As a result of the unrhythmic behaviour, an unnecessary loss of energy occurs and the shaft couplings are subject to increased load, which also gives rise to the disadvantage that the springs can become weak, and it can easily be imagined that if the springs on only one shaft coupling are weakened the entire rhythm will go out of control. It has been shown in practice that mixing machines using the body as a mixing container result in poorer mixing results than machines equipped with a positive drive means, such as, for example, the above-mentioned universal joints, but the latter machines have proved to have little suitability in industrial practice.

SUMMARY OF THE INVENTION

The problem underlying the present invention was, in order to produce a tumbling and rotating body movement of the type mentioned at the beginning, to provide a drive means that does not have the disadvantages of the devices known from the prior art and that makes it possible to drive the body to be set in motion by means of both shafts with the required accelerations and decelerations distributed alternately between the two shafts. According to the present invention, the drive means comprises two hydraulic motors which are respectively connected to the two shafts, the two hydraulic motors being driven by a common volumetric hydraulic pump. As a result of driving the two shafts by means of the two hydraulic motors, which are connected to a common hydraulic pump, there is achieved the required distribution of the torque so that the tumbling and rotating body movement based on the principle of the invertable link chain takes place in the correct rhythm with regard to the drive shafts. All the bearings and force-transmitting parts of the machine are loaded to a much lesser extent than in the case of the above-mentioned known machines and it is possible for the bodies that are to be set in a tumbling and rotating motion, which are preferably constructed in the form of hollow bodies for receiving material to be treated, to be considerably larger than was previously possible. Instead of special equipment, such as the shaft couplings equipped with springs according to DE-PS No. 3 034 331, it is possible to use commercially available motors and pumps. The space required for the drive unit is reduced in comparison with the known devices.

The distribution of the torque necessary for the non-uniform rotation of the two shafts in order to achieve a uniform distribution of the two accelerations and decelerations required alternately, the production of which by mechanical methods gives poor or only approximate results when industrial engineering techniques are applied, is realised in the device according to the invention by the use of an energy transfer medium that is conveyed through lines and of which portions are available in any desired ratio. This circumstance also gives rise to a further advantage of the device according to the invention, which lies in the fact that using one hydraulic pump it is possible in simpler manner to drive a plurality of machines, each having a body to be set in a tumbling and rotating motion, by means of a pressure line to which all the machines are connected.

The speed of the device according to the invention can preferably be regulated by a flow-regulating device arranged in the common line connecting the hydraulic pump, such as, for example, a throttle valve or variable aperture. This applies also to a multiple drive means for a plurality of machines, each machine then being assigned a flow-regulating device which is arranged in a branch line that is connected to the pressure line supplying all the machines and that divides to supply the two hydraulic motors of each machine downstream of the respective flow regulating device.

The body performing a tumbling and rotating movement can have a rotationally symmetrical shape, such as, for example, a cylindrical container. The body is preferably constructed in the form of a container having the shape of an oloid, which means that it has opposite convex edges which have the same radius of curvature and which are oriented at right angles to each other—see Schatz, *Rhythmusforschung und Technik*, Verlag Freies Geistesleben, Stuttgart, 1975, pp. 118–122. Such a container has a hollow chamber of a shape identical to an oloid for receiving material to be treated in order to carry out physical or chemical processes. The use of such a body achieves the extraordinarily good results known from the literature both during mixing and during emulsification or the manufacture of dispersions, etc. The oloid body can also produce its characteristic special effects, however, in a medium surrounding the body. For example, when immersed in water it can be used to introduce oxygen into the water due to agitation thereof, i.e., in fish farms, etc.

Further advantages and details of the invention can be found in the following description and the drawings in which an embodiment of the subject of the invention is shown purely by way of example.

DESCRIPTION OF THE DRAWINGS

FIG. 1 shows a schematic view of the drive means of the tumbling and rotating body;

FIG. 2 shows a schematic view of the drive means for a plurality of machines each having a tumbling and rotating body.

DETAILED DESCRIPTION OF THE PREFERRED EMBODIMENT

According to FIG. 1, two shafts 2 and 3 are rotatably mounted in a machine frame 1 at a distance from one another and in parallel. A fork-shaped gimbal 5 is pivotally mounted by means of a pivot bearing 4 at the end of the shaft 2 and likewise a fork-shaped gimbal 7 is pivotally mounted at the end of shaft 3 by means of a pivot bearing 6. In FIG. 1, the rotational positions of the two fork-shaped gimbals 5 and 7 are displaced by an angle of 90° to one another. On the two fork-shaped gimbals 5 and 7, the body 8, which in FIG. 1 is constructed in the form of an oloid, is attached by means of pivot pins 9, which in FIG. 1 can be seen only in the case of the left-hand fork-shaped gimbal 5, and in the case of the right-hand fork-shaped gimbal 7 lie one behind the other in a direction perpendicular to the plane of the drawing, in such a manner that, in known manner, when the shafts 2 and 3 are turned in opposite directions the body 8 performs a tumbling and rotating movement, the body moving about axes 10 and 11 which are askew to one another and which are formed by the straight lines connecting the pivot pins 9 with the two fork-shaped gimbals 5 and 7.

In order that the body 8 performs a uniform rotating and tumbling movement, the two shafts 2 and 3 must rotate non-uniformly at alternately interchanging increasing and decreasing angular speeds. In other words, when one shaft accelerates, the other shaft must decelerate to the same extent, which process is repeated twice per revolution of the shaft.

In order to drive the two shafts 2 and 3 in the manner described above, shaft 2 is assigned a volumetric hydraulic motor 12 and shaft 3 is assigned a volumetric hydraulic motor 13, each of which motors has the same volumetric capacity. The motors can be, for example, piston motors or gear motors and can be flanged directly onto the ends of the shafts 2 and 3 or can be connected to the shafts by means of a non-positive gear mechanism not shown in the drawing. For driving the two hydraulic motors 12 and 13, they are connected to a common volumetric hydraulic pump 14 by means of a common pressure line 15 and supply lines 16 and 17 branching off the pressure line 15. From the hydraulic motors 12 and 13, the pressure medium passes by way of return lines 18 and 19 back to the oil container 20 from which the pump 14, which is driven by electric motor 21, obtains the pressure oil.

As has already been mentioned above, the course of movement, which is based on the invertable link chain, is such that when one shaft accelerates the other shaft decelerates so that the sum of the two rotational movements is constant. The hydraulic pump 14 supplies at a certain rate a constant volume of pressure oil which is divided between the two hydraulic motors 12 and 13 in such a manner that each of the two hydraulic motors is supplied with an alternately interchanging increasing or decreasing partial volume, the distribution of the volume of oil being effected as a result of the mechanical connection of the two shafts 2 and 3, driven by the hydraulic motors, by means of the two fork-shaped gimbals 5 and 7 and the body 8, that is to say as a result of the kinematic connection of the two shafts which is based on the movement principle of the invertable link chain.

The speed of the two shafts 2 and 3 can be regulated by regulating the volumetric displacement of the hydraulic pump 14. For regulation it is also possible to use a flow regulating device arranged in the common line 15 connected to the hydraulic pump 14, which device can be a variable flow aperture or a throttle valve and is associated with a pressure relief valve, not shown in FIG. 1.

FIG. 2 shows, in schematic form and without showing the body to be turned and the shafts necessary for that purpose, a multiple drive means which shows that in a preferred manner it is possible using the hydraulic drive means to drive a plurality of bodies 8 that are to be set in a tumbling and rotating motion according to FIG. 1 with the aid of a hydraulic pump 14. There are connected to a main pressure line 15, which is connected to the hydraulic pump 14, a plurality of pressure lines 15a, 15b and 15c which are each branched and lead to two hydraulic motors 12 and 13, and in each of these lines there is arranged a throttle valve 25 so that the speed of each body to be set in motion can be regulated separately. In this multiple drive means a pressure relief valve 26 is provided in the main pressure line 15.

The body 8 that is to be set in a tumbling and rotating motion is shown as an oloid in FIG. 1 and is preferably a container having a hollow chamber that is also of oloid shape and is used for receiving material to be treated for carrying out physical or chemical processes. The body is preferably used for receiving material to be mixed, and during the course of movement no centrifugal forces arise which frequently produce a separating effect. The body driven in the manner according to the invention can, however, have any other shape, for example it can be of cylindrical construction, as long as the body can be movably suspended on the fork-shaped gimbals. A body constructed in the form of an oloid serves not only as a mixing container but is used very successfully also in a medium surrounding the rotating and tumbling body, for example for the introduction of oxygen into water.

I claim:

1. In a treatment apparatus which includes a body element; two fork-shaped gimbals which include pivot pins and which are attached to said body element by said pivot pins so as to enable said body element to rotate about two axes which are askew to one another, two parallel drive shafts which include pivot bearings and which are respectively attached to said gimbals by said pivot bearings, and drive means for rotating said parallel drive shafts in opposite directions and with alternately interchanging increasing and decreasing angular speeds, thus causing said body element to perform a tumbling and rotating movement, the improvement wherein said drive means comprises two hydraulic drive motors respectively connected to said drive shafts for rotating said drive shafts, a volumetric hydraulic pump, and a supply line means connecting said volumetric hydraulic pump to said respective hydraulic drive motors, such that hydraulic fluid from said volumetric hydraulic pump will flow through said supply line to said two hydraulic motors with alternately interchanging increasing and decreasing partial volumes as determined by the interconnection of said drive shafts via said body element, thus causing said two parallel drive shafts to rotate in opposite directions and with alternately interchanging increasing and decreasing angular speeds.

2. The treatment apparatus according to claim 1, wherein said supply line means comprises a common output line connected to said volumetric hydraulic pump and two branch lines which are both connected to said common output line and respectively connected to said two hydraulic drive motors.

3. The treatment apparatus according to claim 2, wherein said common output line includes a flow-regulating device for controlling the flow of hydraulic fluid to said hydraulic drive motors and thus the speed at which said two hydraulic drive motors rotate said parallel drive shafts.

4. The treatment apparatus according to claim 1, including an electric motor connected to said volumetric hydraulic pump to operate said volumetric hydraulic pump.

5. The treatment apparatus according to claim 1, including a container for hydraulic fluid, an input line extending between said container and said volumetric hydraulic pump, and return lines respectively extending from said two hydraulic drive motors to said container.

6. The treatment apparatus according to claim 1, wherein said body element has an oloid shape.

* * * * *